(12) United States Patent
Mitra et al.

(10) Patent No.: US 11,532,062 B2
(45) Date of Patent: Dec. 20, 2022

(54) DISTRIBUTED VEHICLE ACCESS

(71) Applicant: Ford Global Technologies, LLC, Dearborn, MI (US)

(72) Inventors: Pramita Mitra, West Bloomfield, MI (US); Amanuel Zeryihun, Pinole, CA (US); James Fishelson, Ypsilanti, MI (US); Eric H. Wingfield, Ann Arbor, MI (US); Yifan Chen, Ann Arbor, MI (US); Abhishek Sharma, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 535 days.

(21) Appl. No.: 16/595,791

(22) Filed: Oct. 8, 2019

(65) Prior Publication Data

US 2021/0104003 A1    Apr. 8, 2021

(51) Int. Cl.
| | |
|---|---|
| *G06Q 50/30* | (2012.01) |
| *G06Q 20/08* | (2012.01) |
| *G06Q 20/36* | (2012.01) |
| *B60R 25/20* | (2013.01) |

(52) U.S. Cl.
CPC ......... *G06Q 50/30* (2013.01); *B60R 25/2018* (2013.01); *G06Q 20/085* (2013.01); *G06Q 20/367* (2013.01)

(58) Field of Classification Search
CPC .... G06Q 50/30; G06Q 30/0283; G06Q 10/02; G06Q 30/064
See application file for complete search history.

(56) References Cited

U.S. PATENT DOCUMENTS

| | | | |
|---|---|---|---|
| 10,225,076 B2 | 3/2019 | Leng et al. | |
| 2002/0072963 A1 | 6/2002 | Jonge | |
| 2004/0119609 A1 | 6/2004 | Solomon | |
| 2010/0161392 A1 | 6/2010 | Ashby et al. | |
| 2014/0310075 A1* | 10/2014 | Ricci | B60W 50/085 |
| | | | 705/13 |
| 2018/0075566 A1* | 3/2018 | Lacey | G06Q 10/02 |
| 2019/0035166 A1 | 1/2019 | Amin | |
| 2020/0151817 A1* | 5/2020 | Mahfouz | G06Q 20/3674 |
| 2022/0065636 A1* | 3/2022 | DeLizio | G05D 1/0291 |

FOREIGN PATENT DOCUMENTS

| | | |
|---|---|---|
| CN | 108717659 A | 10/2018 |
| CN | 108765591 A | 11/2018 |

OTHER PUBLICATIONS

Akash Madhusudan, Applying Smart Contracts to Secure Car Sharing Systems, Academic year 2018-2019 (Year: 2018).*
Cherney et al.,"Uber Wants You to Catch the Bus or Train—if They Can Drive You There", updated Jan. 29, 2019, https://www.wsj.com/articles/uber-wants-you-to-catch-the-bus-or-trainif-they-can-drive-you-there-11548763669.

* cited by examiner

*Primary Examiner* — Resha Desai
*Assistant Examiner* — Ismail A Manejwala
(74) *Attorney, Agent, or Firm* — Brandon Hicks; Bejin Bieneman PLC (57) ABSTRACT

A usage rule specifies a number of tokens to access a vehicle. Authorization of a request to access the vehicle is based on receiving the number of tokens specified by the usage rule. The request is stored to an electronic ledger. Actuation of the vehicle is based on the request being authorized. An allocation rule specifies the number of tokens allocated to each of an entity and the vehicle based on the request. Allocation of tokens to the entity and the vehicle is based on the allocation rule.

18 Claims, 4 Drawing Sheets

DISTRIBUTED VEHICLE ACCESS

BACKGROUND

Digital data collected and/or stored in vehicles can be lost or corrupted and can also be vulnerable to alteration. Such data can be important for monitoring and authorizing users to access vehicles. It is a problem that data for user access to a vehicle can be lost or corrupted.

DETAILED DESCRIPTION

A method includes determining a usage rule for a vehicle based on a request to access the vehicle. The usage rule specifying a number of tokens to access the vehicle. The method further includes authorizing the request based on receiving the number of tokens specified by the usage rule and storing the request to an electronic ledger, actuating the vehicle based on the request being authorized, and determining an allocation rule specifying the number of tokens allocated to each of an entity and the vehicle based on the request and allocating tokens to the entity and the vehicle based on the allocation rule.

Actuating the vehicle includes operating the vehicle along a route.

The method can further include determining the allocation rule based further on a time of day the vehicle is operating. The allocation rule is different at different times of day.

The method can further include determining the allocation rule based further on an identifier for the vehicle. The allocation rule is different for different vehicles.

The method can further include determining the allocation rule based further on a route for the vehicle to travel. The allocation rule is different for different routes.

The method can further include determining the allocation rule based further on an occupancy rate of the vehicle. The allocation rule is different for different occupancy rates.

The method can further include determining the usage rule based on the allocation rule. The usage rule is different for different allocation rules.

The method can further include receiving the request from a user device. The request specifying an identifier of the user device.

The method can further include authorizing the request based further on querying the electronic ledger to determine the identifier of the user device is an authorized identifier.

The method can further include initiating the request based on a location of the vehicle.

A system includes a computer including a processor and a memory, the memory storing instructions executable by the processor to determine a usage rule for a vehicle based on a request to access the vehicle. The usage rule specifying a number of tokens to access the vehicle. The instructions further include instructions to authorize the request based on receiving the number of tokens specified by the usage rule and store the request to an electronic ledger, actuate the vehicle based on the request being authorized, and determine an allocation rule specifying the number of tokens allocated to each of an entity and the vehicle based on the request and allocate tokens to the entity and the vehicle based on the allocation rule.

Actuating the vehicle includes operating the vehicle along a route.

The instructions can further include instructions to determine the allocation rule based further on a time of day the vehicle is operating. The allocation rule is different at different times of day.

The instructions can further include instructions to determine the allocation rule based further on an identifier for the vehicle. The allocation rule is different for different vehicles.

The instructions can further include instructions to determine the allocation rule based further on a route for the vehicle to travel. The allocation rule is different for different routes.

The instructions can further include instructions to determine the allocation rule based further on an occupancy rate of the vehicle. The allocation rule is different for different occupancy rates.

The instructions can further include instructions to determine the usage rule based on the allocation rule. The usage rule is different for different allocation rules.

The instructions can further include instructions to receive the request from a user device. The request specifying an identifier of the user device.

The instructions can further include instructions to authorize the request based further on querying the electronic ledger to determine the identifier of the user device is an authorized identifier.

The instructions can further include instructions to initiate the request based on a location of the vehicle.

Further disclosed herein is a computing device programmed to execute any of the above method steps. Yet further disclosed herein is a computer program product, including a computer readable medium storing instructions executable by a computer processor, to execute an of the above method steps.

A plurality of computers 110, 140 generate and maintain a blockchain ledger 150 for managing authorized requests to access a vehicle 105. Each of the plurality of computers 110, 140 is communicatively coupled in a blockchain network 111. For example, the computers 110, 140 may be included in computing devices 140 external to the vehicle 105 and a vehicle computer 110. The blockchain network 111 includes distributed computers 110, 140 as a peer-to-peer network or a peer-to-peer network with a supervisory computer. The computers 110, 140 authorized to participate in the blockchain network 111 are listed in the blockchain ledger 150.

In this disclosure, the term "network" in the context of a blockchain means a network formed by computers 110, 140, i.e., a blockchain network means the computers 110, 140 that form the blockchain, including links to each other stored by the computers 110, 140. On the other hand, a "network" in the context of devices communicating with each other, e.g., ECUs and/or devices communicating via a vehicle network and/or wide area network 135, means a physical wired and/or wireless network comprising conventional networking hardware, media, protocols, etc.

Authorized requests to access the vehicle 105 can be stored as data blocks in the blockchain ledger. The blockchain ledger 150 is one example of an electronic ledger. An electronic ledger is a distributed database. "Distributed" in this context means that copies of the database are maintained by multiple entities with access to the electronic ledger, e.g., to verify data on the ledger, to store data to the ledger, etc. The data blocks stored within the blockchain ledger 150 are linked in chains by hashes.

A blockchain 150 is an electronic ledger maintained in each of a plurality of the computers 110, 140 that form the blockchain network 111, each storing data based on generation of hashes for blocks of data. A hash in the present context is a one-way encryption of data, i.e., a result of executing a hash function, having a fixed number of bits. An example of hash encryption is SHA-256. The hashes, i.e., results of hash functions, provide links to blocks of data by identifying locations of the block of data in storage (digital memory), for example by use of an association table mapping hashes to respective storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key. An example structure of a blockchain ledger 150 is discussed below in reference to FIG. 2.

Figure 1A:
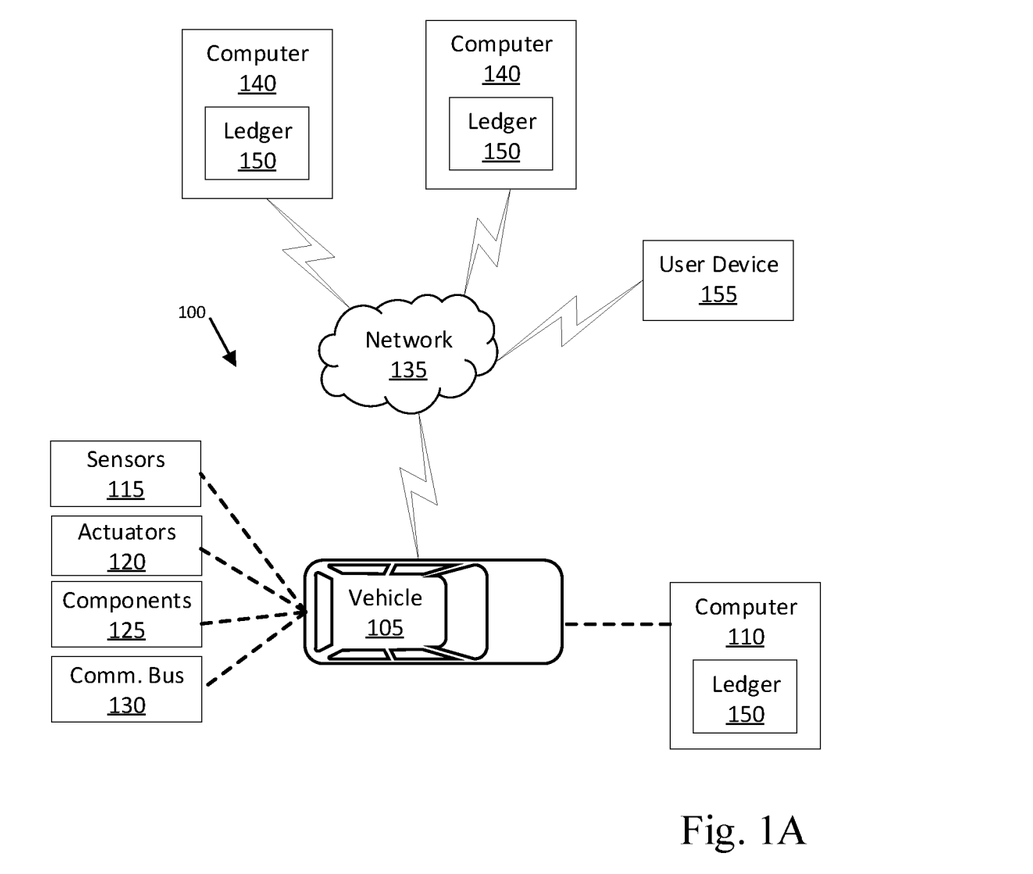
FIG. 1A is a block diagram illustrating an example system to authorize access to a vehicle.

FIG. 1A is a block diagram of an example system 100 that includes an instance of a blockchain ledger 150 hosted on at least one entity computer 140 and a vehicle computer 110. The vehicle computer 110 is programmed to determine a usage rule for a vehicle 105 based on a request to access the vehicle 105. The usage rule specifies a number of tokens to access the vehicle 105. The vehicle computer 110 is further programmed to authorize the request based on receiving the number of tokens specified by the usage rule. The computers 110, 140 are programmed to store the request to an electronic ledger, e.g., the blockchain ledger 150. The vehicle computer 110 is programmed to actuate the vehicle 105 based on the request being authorized. The computers 110, 140 are further programmed to determine an allocation rule specifying the number of tokens allocated to each of an entity and the vehicle 105 based on the request and to allocate tokens to the entity and the vehicle 105 based on the allocation rule.

The entity may request tokens from the vehicle computer 110 based on transportation services rendered by the vehicle 105. For example, a vehicle computer 110 may receive tokens from a user to provide the user access to the vehicle 105, and then the vehicle computer 110 may allocate a portion of the tokens to the entity, e.g., at predetermined time intervals such as once per day, week, month, etc. Herein, an "entity" is a user or users that specifies vehicle computers 110 that can host an instance of the blockchain ledger 150. Advantageously, the computers 110, 140 can allocate tokens for each request based on determining the applicable allocation rule stored in the electronic ledger, which allows the entity to receive the specified number of tokens without relying on the vehicle computer 110 to transfer the tokens at a later time.

The vehicle 105 includes a vehicle computer 110, sensors 115, actuators 120, vehicle components 125, and a vehicle communications bus 130. Via a network 135, the communications bus 130 allows the vehicle computer 110 to communicate with other computing devices.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle communications network 130 such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle communications network 130, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network 130 may be used for communications between devices represented as the vehicle computer 110 in this disclosure. Further, as mentioned below, various controllers and/or sensors 115 may provide data to the vehicle computer 110 via the vehicle communication network 130.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the vehicle computer 110 may be configured for communicating via a vehicle-to-vehicle communication bus 130 or interface with devices outside of the vehicle 105, e.g., through a vehicle-to-vehicle (V2V) or vehicle-to-infrastructure (V2X) wireless communications to another vehicle, and/or to other computers (typically via direct radio frequency communications). The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

A user device 155 may be programmed to transmit tokens to and/or receive tokens from one or more other computers 110, 140. The user device 155 may, for example, store tokens in a memory of the user device 155.

The user device 155 may be programmed to transmit a request to access the vehicle 105 to the vehicle computer 110, e.g., via the network 135. For example, the user device 155 can receive input, e.g., via an interface, from a user specifying the request. A user device 155 be can be any one of a variety of computers that can be used while carried by a person, e.g., a smartphone, a tablet, a personal digital assistant, a smart watch, etc.

Typically, a request to access the vehicle 105 includes a request to transport a user in the vehicle 105 along a route. That is, the request specifies a route to transport the user in the vehicle 105. Further, the route includes a specification of a time or times of day, e.g., to begin and end transportation along the route. Additionally, the request specifies an identifier for the user device 155. Herein, an "identifier" is a set of data, e.g., an alphanumeric string of data, that substantially uniquely identifies a thing, e.g., a vehicle 105, a user device 155, an entity computer 140, etc. Further, the request may, for example, specify an identifier for the vehicle 105. That is, the user device 155 may request a specific vehicle 105 to transport the user along the route. Additionally, or alternatively, the user device 155 may initiate a request based on a location of the vehicle 105 relative to the user device 155. For example, the user device 155 may initiate a request to access the vehicle 105 when the vehicle 105 is within a predetermined radius of the user device 155. The user device 155 may detect the vehicle 105 within the predetermined radius by, e.g., GPS-based geo-fencing, BLE, wireless local area networks (WLAN), radio-frequency identification (RFID), etc.

Figure 1B:
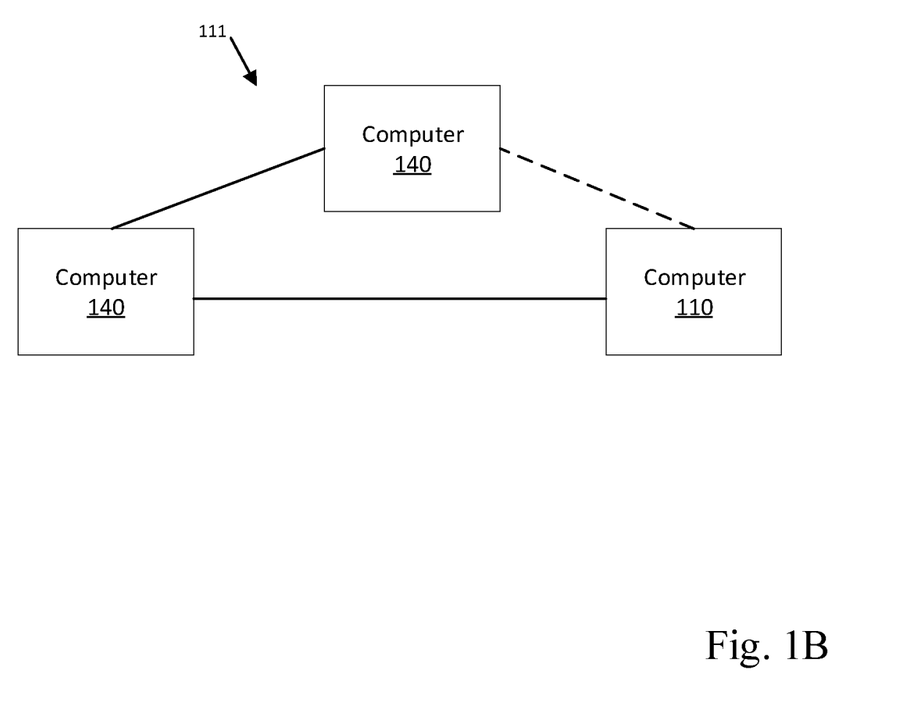
FIG. 1B is a block diagram illustrating an example blockchain network.

The blockchain network 111 (as shown in FIG. 1B) communicatively couples the plurality of computers 110, 140. In an example, the plurality of computers 110, 140 is a peer-to-peer network, with each computer in the peer-to-peer network connected to at least one other computer. Initial computers in the plurality of computers 110, 140 may be specified by, e.g., the vehicle 105 manufacturer, a government agency, etc., and may be recorded in the blockchain ledger 150.

The blockchain ledger 150 is a distributed blockchain ledger. That is, each computer 110, 140 stores, e.g., in a memory, one copy of the blockchain ledger 150. The computers 110, 140 may, for example, receive data blocks from other computers 110, 140 and may upload the data blocks to their respective copies of the blockchain ledger 150, i.e., store the respective data blocks in respective storage locations in their respective blockchain ledgers 150 such that each data block is linked to one respective previous data block. The data blocks may be generated based on requests, which may be submitted, for example, from a user device 155. Each computer 110, 140 can compare its stored blockchain data, i.e., linked data blocks, to blockchains stored by other computers 110, 140 to verify the data blocks. For example, each computer 110, 140 can generate a hash based on the data stored in a respective data block of a blockchain stored by another computer 110, 140. In the case the hash generated by one computer 110, 140 matches the hash stored by the other computers 110, 140 for the respective data block, the one computer 110, 140 determines the data block is verified.

The plurality of computers 110, 140 maintains the blockchain ledger 150. That is, the plurality of computers 110, 140 may receive requests from time to time to add a computer to the plurality of computers 110, 140. The computer may be, for example, from another vehicle 105, a computer external to the vehicle 105, etc. The computers 110, 140 in the plurality of computers 110, 140 evaluate the request. In case that the request is approved, the plurality of computers 110, 140 adds the computer to the plurality of computers 110, 140 and adds a data block to the blockchain ledger 150 recording the addition.

Additionally, or alternatively, the plurality of computers 110, 140 may receive requests to access the vehicle 105 from a user device 155. The computers 110, 140 in the plurality of computers 110, 140 evaluate the request, as described below. In the case that the request is approved, each of the plurality of computers 110, 140 adds a data block to the blockchain ledger 150 recording the authorization.

Each computer 110, 140 stores one copy of the blockchain ledger 150. The computers 110, 140 can be accessed via the communications network 135. The computers 110, 140 may be associated with an entity that participates in maintaining the blockchain ledger 150, e.g., to verify data in the blockchain ledger 150, to store data on the blockchain ledger 150, etc. For example, the computers 110, 140 may be computing devices external to the vehicle 105, e.g., an entity computer 140, and computing devices internal to the vehicle 105, e.g., the vehicle computer 110.

The vehicle computer 110 may be programmed to transmit tokens to and/or receive tokens from one or more other computers 110, 140. The vehicle computer 110 may, for example, store tokens in a memory of the vehicle computer 110.

The vehicle computer 110 is programmed to receive, e.g., via the network 135, a request from a user device 155. Upon the computers 110, 140 authorizing the request (as described below), the vehicle computer 110 is programmed to actuate the vehicle 105. For example, the vehicle computer 110 may be programmed to actuate one or more vehicle components 125, e.g., locks, doors, etc., to allow the user to access the vehicle 105. Additionally, the vehicle computer 110 may actuate vehicle components 125, e.g., at least one of a brake, a steering, and a propulsion, to operate the vehicle 105 along the route specified by the request.

The vehicle computer 110 can store, e.g., in a memory, a usage rule. Herein, a "usage rule" is a specification of a number of tokens (the number can be one or more) required to access the vehicle 105 to transport the user along the route. In the present context, a "token" is data that represents a number of units of an object and is transferrable on the blockchain. The unit can be, for example, a unit of currency money, e.g., 0.01 cents, 0.1 cents, 1 cent, a unit of virtual currency (or faction thereof), etc., an amount of an object, e.g., size or weight, of a raw material object, e.g., 1 gram of gold or silver, 1 foot of lumber, etc. Upon receiving the request to access the vehicle 105 from the user device 155, the vehicle computer 110 may be programmed to transmit the usage rule to the user device 155.

The usage rule is typically determined by the vehicle 105 according to an algorithm or formula that determines the number of tokens according to one or more measurements, e.g., a distance traveled, an elapsed time to travel a route, etc. The usage rule, as stated above, specifies a predetermined number of one or more tokens required to access the vehicle 105 to transport the user along the route. A usage rule is typically specified for each vehicle 105, and therefore typically includes an identifier of the vehicle 105. The usage rule may, for example, be determined based on the route. For example, the usage rule may specify one or more tokens based on a distance travelled along the route, e.g., a number of tokens for every mile travelled, as shown in Equation 1 below.

$$T_a = T_r d \qquad \text{Equation 1}$$

Wherein "$T_a$" is the number of tokens to access the vehicle 105, "$T_r$" is the rate of tokens per unit of distance, and "d" is the distance, e.g., in miles, along the route the vehicle 105 transports the user.

As another example, the usage rule may specify an expenditure of one or more tokens based on the duration the vehicle 105 is travelling along the route, i.e., a rate of token expenditure per unit of time, e.g., five tokens expended for every ten minutes (or fraction thereof), as shown in Equation 2 below.

$$T_a = E_r t \qquad \text{Equation 2}$$

Wherein "$T_a$" is the number of tokens to access the vehicle 105 and "t" is the duration of time, e.g., in minutes, the vehicle 105 is transporting the user along the route, and "$E_r$" is the rate of token expenditure per unit of time.

As yet another example, the usage rule may be determined based on the allocation rule. That is, the usage rule may be different for different allocation rules, e.g., may specify that the number of tokens in some percentage or ratio, e.g., expressed as a weight w, of a number of tokens to be allocated to an entity, as shown in Equation 3 below.

$$T_a = w T_e \qquad \text{Equation 3}$$

Wherein "$T_a$" is the number of tokens to access the vehicle 105 and "$T_e$" is the number of tokens allocated to the entity based on the applicable allocation rule, and w is the weight, or ratio, e.g., 0.8, 1.2, 1.5, etc. For example, in the case the allocation rule specifies, e.g., ten tokens, be allocated to the entity, the usage rule may specify, e.g., twelve tokens, to access the vehicle 105, as compared to the case where the allocation rule specifies, e.g., five tokens, be allocated to the entity, the usage rule may specify, e.g., six tokens, to access the vehicle 105.

The entity computer 140 is a computing device including a processor and a memory as are known. The entity computer 140 may be maintained by an entity, e.g., a government agency. The entity computer 140 may transmit tokens to and/or receive tokens from one or more other computers 110, 140. The entity computer 140 may, for example, store tokens in a memory of the entity computer 140.

The computers 110, 140 can store an allocation rule to the blockchain ledger 150. Herein, an "allocation rule" is a specification of numbers of tokens (the number can be a fraction of one, or one or more) to be distributed to the entity and the vehicle 105 for the vehicle 105 transporting the user along the route. The computers 110, 140 can store one or more allocation rules in the blockchain ledger 150. The computers 110, 140 may determine the applicable allocation rule for a request by querying the blockchain ledger 150. The allocation rule identifies each computer 110, 140 that receives tokens from the user device 155 upon authorization of the request, and further specifies a number, percentage, or fraction of the token(s) allocated to the entity and the vehicle 105. For example, the allocation rule may specify that four of five tokens received for transporting the user are allocated to the vehicle 105 and the other of the five tokens is allocated to the entity.

The allocation rule is typically determined by an entity and the vehicle 105 owner. For example, a user representing the entity and the vehicle 105 owner can input the allocation rule into the respective computer 110, 140. In such an example, the entity computer 140 and the vehicle computer 110 can transmit the allocation rule to each other and/or one or more other computers 140. The computers 110, 140 can compare the allocation rules transmitted by each of the entity computer 140 and the vehicle computer 110. In the case that the allocation rules match, i.e., specify the same allocation of tokens to the vehicle computer 110 and the entity computer 140, respectively, the computers 110, 140 can authorize the allocation rule and store the allocation rule to the blockchain ledger 150. In the case that the allocation rules do not match, the computers 110, 140 can reject the allocation rule.

The allocation rule typically includes an identifier for the vehicle 105, i.e., specifies a vehicle 105 to which the allocation rule applies. The allocation rule may, for example, be based on the identifier of the vehicle 105. That is, the allocation rule may be different for different vehicles 105. For example, the allocation rule for a user being transported by a bus may be different than the allocation rule for a user being transported by a personal vehicle 105. For example, the allocation rule for a user being transported by bus could specify that four of five usage tokens are allocated to the bus, and the allocation rule for a user being transported by a personal vehicle 105 could specify that three of five usage tokens are allocated to the personal vehicle 105.

Additionally, or alternatively, the allocation rule may be based on a time of day at which the vehicle 105 is operating. That is, the allocation rule may be different at different times of day. For example, the allocation rule may specify two of five tokens are allocated to the vehicle 105 during heavy traffic periods, e.g., from 7 a.m. to 9 a.m. and 3 p.m. to 6 p.m., and four of five tokens are allocated to the vehicle 105 during the other times of the day (with the remaining token(s) in each instance being allocated to the entity).

Additionally, or alternatively, the allocation rule may be based on the route along which the vehicle 105 travels. That is, the allocation rule may be different for different routes. For example, the allocation rule may specify three of five tokens are allocated to the vehicle 105 transporting the user in a city, and four of five tokens are allocated to the vehicle 105 transporting the user outside of the city (with the remaining token(s) in each instance being allocated to the entity). As another example, the allocation rule may specify three of five tokens are allocated to the vehicle 105 travelling on residential roads, and four of five tokens are allocated to the vehicle 105 travelling on freeways (with the remaining token(s) in each instance being allocated to the entity). As another example, the allocation rule may specify three of five tokens are allocated to the vehicle 105 for transporting the user less than, e.g., two miles, and four of five tokens are allocated to the vehicle 105 transporting the user more than, e.g., two miles (with the remaining token(s) in each instance being allocated to the entity).

Additionally, or alternatively, the allocation rule may be based on data received from a device, e.g., a vehicle sensor 115, a server, a computer external to the vehicle 105, etc., on a vehicle communications bus 130. That is, the allocation rule may be different based on the data received on the vehicle communications bus 130. As an example, the allocation rule may be based on the occupancy rate of the vehicle 105. That is, the allocation rule may be different for different occupancy rates of the vehicle 105. The occupancy rate is the number of vacant seats in the vehicle 105 divided by the total number of seats in the vehicle 105. For example, the allocation rule may specify that four of five tokens are allocated to the vehicle 105 with an occupancy rate above eighty percent, and three of five tokens are allocated to the vehicle 105 with an occupancy rate below eighty percent (with the remaining token(s) in each instance being allocated to the entity). The total number of seats in the vehicle 105 may be stored in a memory of the vehicle computer 110. The number of vacant seats may be determined based on sensor 115 data, e.g., an image of the cabin of the vehicle 105 when the vehicle computer 110 receives the request from the user device 155. As another example, the vehicle computer 110 may receive, e.g., traffic data, weather data, road construction data, etc., via the vehicle communications bus 130. The allocation rule may, for example, specify a two of five tokens are allocated to the vehicle 105 during heavy precipitation, and may specify one of five tokens are allocated to the vehicle 105 operating in a road construction zone (with the remaining token(s) in each instance being allocated to the entity).

As one example, the allocation rule can specify a number of tokens $T_e$ allocated to the entity based on Equation 4 below.

$$T_e = T_r d + T_r dh + T_o r \qquad \text{Equation 4}$$

Wherein "d" is the distance, e.g., in miles, the vehicle 105 transports the user along the route, "$T_r$" is the rate of tokens per unit of distance, "h" is the time of day of operation, "$T_v$" is a second rate of tokens per unit of distance, "$T_o$" is a number of tokens, and "r" is the occupancy rate of the vehicle 105. In such an example, "h" is a binary value, e.g., 0 or 1. For example, in the case that the time of day of operation is during heavy traffic periods, "h" is 1. Otherwise, "h" is 0. Additionally, "r" may be a binary value, e.g., 0 or 1. For example, in the case that the occupancy rate is above a threshold value, e.g., eighty percent, "r" is 0. Otherwise, "r" is 1. As another example, "r" may be the numerical value of the occupancy rate of the vehicle 105, e.g., 0.5.

Additionally, the allocation rule can specify the number of tokens $T_v$ allocated to the vehicle 105 based on Equation 5 below.

$$T_v = T_a - T_e \qquad \text{Equation 5}$$

Wherein "$T_a$" is the number of tokens to access the vehicle 105 based on the applicable usage rule and "$T_e$" is the number of tokens allocated to the entity based on the applicable allocation rule.

The computers 110, 140 are programmed to allocate tokens to the entity and the vehicle 105 based on the applicable allocation rule. Upon the vehicle computer 110 authorizing the request, the user device 155 allocates, i.e., assigns, the number of tokens specified by the allocation rule to the vehicle computer 110 and the entity computer 140 identified by the allocation rule.

The computers 110, 140 are programmed to vote to accept or reject the request to access the vehicle 105. The result of the vote may be based on a majority of the computers 110, 140 in the plurality of computers 110, 140. Further, the result of the vote may be based on a weighted majority wherein each of the computers 110, 140 are assigned weights. Each computer 110, 140 may be allotted a vote with a predetermined weight (for example, stored in memory by the device manufacturer, or for aftermarket devices, stored in memory when the aftermarket device is added to the blockchain ledger 150). The weight may be predetermined, for example, based on the entity associated with the computers 110, 140. As an example, the entity computer 140 may have a higher predetermined weight than the vehicle computer 110.

The computers 110, 140 may evaluate the request and determine whether to accept or reject the request, i.e., how to vote on the request. The computers 110, 140 perform the evaluation based on one or more criteria. A first criterion may be whether the vehicle 105 is an authorized vehicle. For example, the blockchain ledger 150 may store identifiers of authorized vehicles. Upon receiving the response from the vehicle 105 accepting the request, the computers 110, 140 may query the electronic ledger to determine whether the identifier of the vehicle 105 matches an identifier of an authorized vehicle. In the case the identifier of the vehicle 105 matches an identifier of an authorized vehicle, the computers 110, 140 determine the vehicle 105 is an authorized vehicle.

Additionally, or alternatively, other criteria may include whether the user has enough tokens. For example, the user device 155 then can transmit data identifying the number of tokens allocated to the user, i.e., stored in a memory of the user device 155, and the computers 110, 140 can compare the data to the token(s) specified in the applicable usage rule. The computers 110, 140 can accept the request when the user's available tokens meet or exceed the token(s) specified in the usage rule. Conversely, the computers 110, 140 serve to reject the request when the user tokens are below the token(s) specified in the usage rule.

Additionally, or alternatively, other criteria may include the presence or absence of available occupancy in the vehicle 105. For example, the computers 110, 140 can accept the request when the vehicle 105 has available occupancy to transport the user. Conversely, the computers 110, 140 can reject the request when the vehicle 105 lacks available occupancy to transport the user.

Additionally, or alternatively, other criteria may be used to evaluate the request to determine whether to vote positively or negatively with respect to granting requested authorization. For example, the computers 110, 140 may maintain a list of identifiers of user devices 155 that can be authorized. The computers 110, 140 may require that an identifier be supplied by a user device 155 requesting access that appears on the list of identifiers that can be authorized and only accept requests from user devices 155 that supply such an identifier. That is, the computers 110, 140 may querying the blockchain ledger 150 to determine the identifier of the user device 155 is an authorized identifier. In a case that one or more of the criteria for acceptance by the computers 110, 140 are not met, the computers 110, 140 will vote to reject the request.

Figure 2:
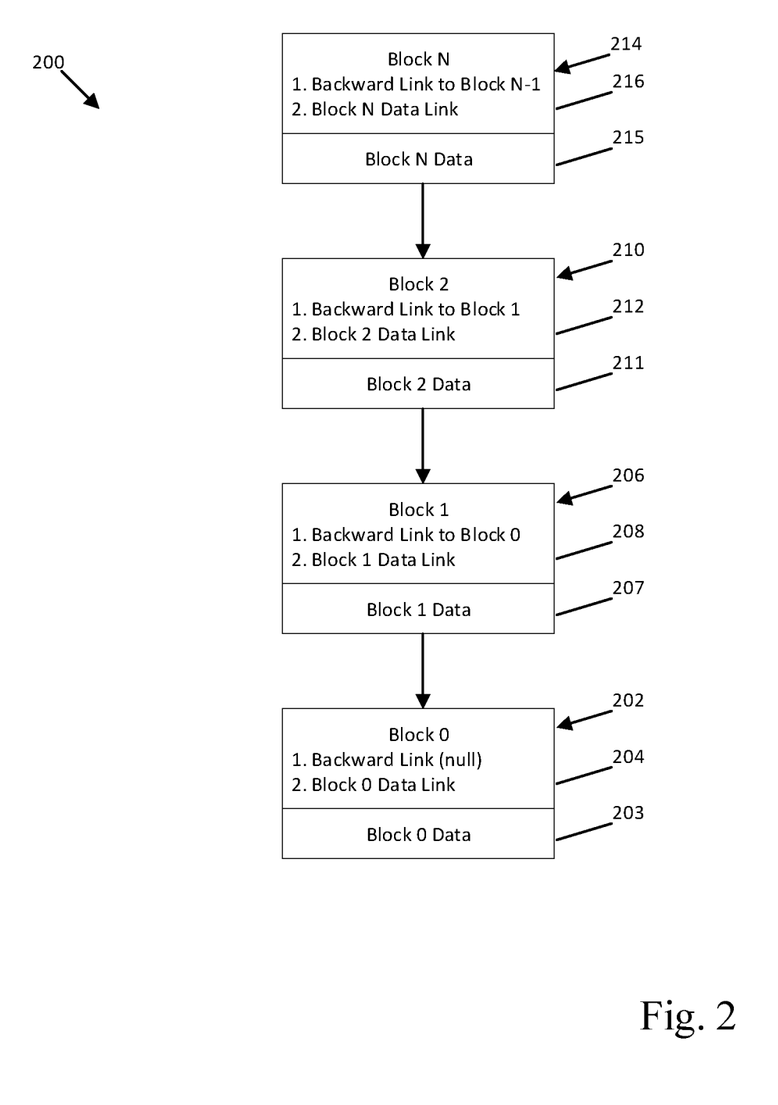
FIG. 2 is an example of a blockchain ledger.

FIG. 2 is an example of a blockchain 200 such as may be used for the blockchain ledger 150. The blockchain 200 includes a zero data block 202, a first data block 206, a second data block 210 and a nth data block 214. The blocks are organized in a chain. The zero data block 202 is at a first, beginning end of the chain. The first data block 206 is linked to the zero data block 202. The second data block 210 is linked to the first data block 206. Each successive data block is linked to the previous data block. The nth data block 214, at a second end of the chain, is linked to the (n−1)th data block (not shown).

Each block includes a data portion and a linking portion as shown in Table 1.

TABLE 1

| Data Block | Data Portion | Linking Portion |
| --- | --- | --- |
| 202 | 203 | 204 |
| 206 | 207 | 208 |
| 210 | 211 | 212 |
| 214 | 215 | 216 |

The data portion 203, 207, 211, 215 includes data to be stored in the data block. The linking portion 204, 208, 212, 216 includes a link to the data portion, and, except for the zero data block, includes a link to the previous data block in the chain. For example, in the first data block 206, the data portion 207 stores data. The linking portion 208 includes a link "block 1 data link" that provides a link to the data portion 207. The linking portion 208 further includes a link "backward link to block 0" that provides a link to the linking portion of data block 0.

Figure 3:
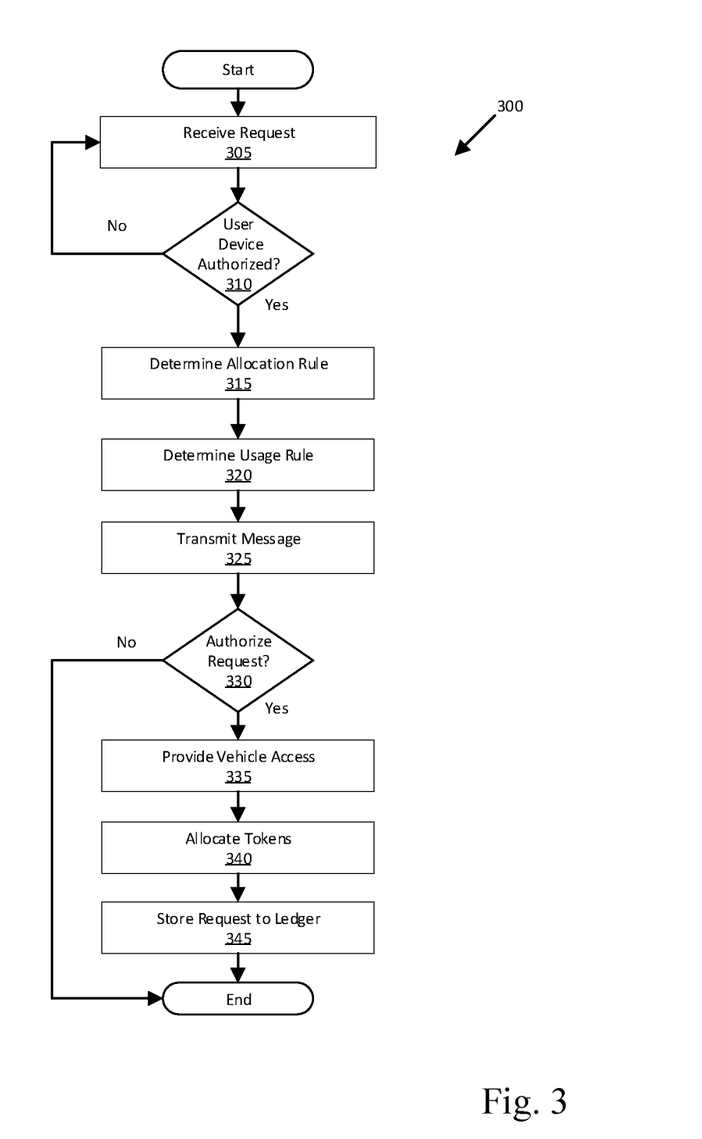
FIG. 3 is a flow diagram of an example process for authorizing access to the vehicle.

FIG. 3 is a diagram of an example process 300 for authorizing access to a vehicle 105. The process begins in a block 305.

In the block 305, the vehicle computer 110 receives a request from a user device 155 for a user to access the vehicle 105. For example, the user can input a request to the user device 155, e.g., via an interface, and the user device 155 can transmit the request to the vehicle computer 110, e.g., via the network 135. As another example, the user device 155 can initiate the request based on, e.g., a location of a vehicle 105 relative to the user device 155. The request includes an identifier of the user device 155 and a route, as described above. Alternatively, the entity computer 140 can receive a request from the user device 155 and then can transmit the request to the vehicle computer 110. The process 300 continues in a block 310.

In the block 310, the vehicle computer 110 determines whether the user device 155 is authorized. The blockchain ledger 150 may store authorized identifiers that specifies user devices authorized to access the vehicle 105. The vehicle computer 110 may query the blockchain ledger 150 to determine whether the identifier of the user device 155 matches an authorized identifier. In the case the identifier of the user device 155 matches the authorized identifier, the vehicle computer 110 determines user device 155 is authorized to access the vehicle 105. Conversely, in the case the identifier of the user device 155 does not match the authorized identifier, the vehicle computer 110 determines the user device 155 is not authorized to access the vehicle 105. Alternatively, the entity computer 140 can determine whether the user device 155 is authorized and then transmit a message to the vehicle computer 110 indicating whether the user device 155 is authorized. In the case the user device 155 is authorized, the process 300 continues in a block 315. Otherwise, the vehicle computer 110 rejects the request and the process 300 returns to the block 305.

In the block 315, the vehicle computer 110 determines the allocation rule. For example, one or more allocation rules, as described above, may be stored in the blockchain ledger 150, and the vehicle computer 110 may be programmed to query the blockchain ledger 150 for the applicable allocation rule based on the request. The vehicle computer 110 may query the blockchain ledger 150 based on one or more criteria, e.g., a time of day, an identifier for the vehicle, a route for the vehicle, a number of passengers, etc., as described above. The vehicle computer 110 provides the allocation rule that matches the one or more criteria to the user device 155. Alternatively, the entity computer 140 can determine the allocation rule and provide the allocation rule to the user device 155. The process 300 continues in a block 320.

In the block 320, the vehicle computer 110 determines the usage rule. For example, the vehicle computer 110 can store one or more usage rules, e.g., in a memory. As one example, the vehicle computer 110 can determine the applicable usage rule based on the allocation rule. As another example, the vehicle computer 110 can determine the applicable usage rule based on, e.g., a distance travelled along the route, a duration of time expended along the route, etc. The vehicle computer 110 can then transmit the usage rule to the user device 155. Alternatively, one or more usage rules may be stored in the blockchain ledger 150. In these circumstances, the vehicle computer 110 may be programmed to query the blockchain ledger 150 to determine the applicable usage rule based on, e.g., the allocation rule, the identifier of the vehicle 105, the route, etc. The process 300 continues in a block 325.

In the block 325, the user device 155 transmits a message to at least one of the vehicle computer 110 and the entity computer 140. The message indicates a number of tokens stored in a memory of the user device 155. The respective computer 110, 140, determines the number of tokens stored in the user device 155 based on the message. The process 300 continues in a block 330.

In the block 330, the computers 110, 140 vote to authorize or reject the request to access the vehicle 105. For example, in the case that the number of tokens stored by the user device 155 meets or exceeds the number of tokens specified by the usage rule, the computers 110, 140 vote to authorize the request for the user device 155 to access the vehicle 105. In the case that the number of tokens stored by the user device 155 is below than the number of tokens specified by the usage, the computers 110, 140 vote to reject the request for the user device 155 to access the vehicle 105. The vehicle computer 110 receives the votes from the other computers 140 and then determines whether the request is authorized based on the number of votes authorizing the request to access the vehicle 105. The result of the vote may be based on e.g., a majority of the computers 110, 140, i.e., a consensus protocol, a weighted majority vote with each computer 110, 140 assigned a weight, etc., as described above. In the case that the request is authorized, the process 300 continues in a block 335. Otherwise, the process 300 ends.

In the block 335, the vehicle computer 110 is programmed to provide the user device 155 access to the vehicle 105. For example, the vehicle computer 110 may be programmed to actuate one or more vehicle components 125, e.g., doors, locks, etc., to allow the user to physically access the vehicle 105. The vehicle computer 110 may be programmed to actuate one or more vehicle components 125 to operate the vehicle 105 along the route, e.g., specified by the request. The process 300 continues in a block 340.

In the block 340, the user device 155 allocates the tokens based on the applicable allocation rule. That is, the user device 155 transmits the specified number of tokens to the entity computer 140 and the vehicle computer 110, respectively. In this situation, the number of tokens stored in the memory of the user device 155 is decrease according to the usage rule. Additionally, the number of tokens stored in the respective memories of the entity computer 140 and the vehicle computer 110 are increased according to the allocation rule. The process 300 continues in a block 345.

In the block 345, the blockchain ledger 150 is modified. Typically, each computer 110, 140 modifies the respective copy of the blockchain ledger 150 stored in the memory of the computer 110, 140. For example, each computer 110, 140 may add a data block to the respective copy of the blockchain ledger 150. The added data block can include a data portion including an identifier for the user device 155, an identifier for the vehicle 105, an identifier for the entity, the request is authorized, the number of tokens allocated to each of the entity and the vehicle 105, and a route along which the vehicle 105 transports the user. The data block can further include a linking portion including a link to the data portion, and a link to the most recent previous block added to the blockchain ledger 150. Following addition of the data block to the blockchain ledger 150, the process 300 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
determining an allocation rule specifying an allocation of tokens to each of an entity and a vehicle based on a request to access the vehicle by retrieving the allocation rule from an electronic ledger stored in the vehicle by providing a first hash that verifies the allocation rule;
then determining a usage rule for the vehicle based on the request to access the vehicle and the allocation rule, wherein the usage rule specifies a number of tokens to access the vehicle, and wherein the usage rule is different for different allocation rules such that different measurements of usage result in different allocations of tokens to each of an entity and the vehicle;
receiving the tokens from an electronic ledger stored in the vehicle by specifying the usage rule and a second hash for a block of data including the tokens that verifies the tokens;
authorizing the request based on receiving the tokens specified by the usage rule, and based on votes of a plurality of computers that have queried the electronic ledger for data to evaluate the request, and storing the request to the electronic ledger;
actuating at least one or more components of the vehicle, by a processor of the vehicle, based on the request being authorized; and
then allocating tokens to the entity and the vehicle based on the allocation rule.

2. The method of claim 1, wherein actuating the vehicle includes operating the vehicle along a route.

3. The method of claim 1, further comprising determining the allocation rule based further on a time of day the vehicle is operating, wherein the allocation rule is different at different times of day.

4. The method of claim 1, further comprising determining the allocation rule based further on an identifier for the vehicle, wherein the allocation rule is different for different vehicles.

5. The method of claim 1, further comprising determining the allocation rule based further on a route for the vehicle to travel, wherein the allocation rule is different for different routes.

6. The method of claim 1, further comprising determining the allocation rule based further on an occupancy rate of the vehicle, wherein the allocation rule is different for different occupancy rates.

7. The method of claim 1, further comprising receiving the request from a user device, the request specifying an identifier of the user device.

8. The method of claim 7, further comprising authorizing the request based further on querying the electronic ledger to determine the identifier of the user device is an authorized identifier.

9. The method of claim 1, further comprising initiating the request based on a location of the vehicle.

10. A system, comprising a computer including a processor and a memory, the memory storing instructions executable by the processor to:
determine an allocation rule specifying an allocation of tokens to each of an entity and a vehicle based on a request to access the vehicle by retrieving the allocation rule from an electronic ledger stored in the vehicle by providing a first hash that verifies the allocation rule;
then determine a usage rule for the vehicle based on the request to access the vehicle and the allocation rule, wherein the usage rule specifies a number of tokens to access the vehicle, and wherein the usage rule is different for different allocation rules such that different measurements of usage result in different allocations of tokens to each of an entity and the vehicle;

receive the tokens from an electronic ledger stored in the vehicle by specifying the usage rule and a first hash for a block of data including the tokens that verifies the tokens;

authorize the request based on receiving the tokens specified by the usage rule, and based on votes of a plurality of computers that have queried the electronic ledger for data to evaluate the request, and storing the request to the electronic ledger;

actuating at least one or more components of the vehicle, based on the request being authorized; and then allocate tokens to the entity and the vehicle based on the allocation rule.

11. The system of claim 10, wherein actuating the vehicle includes operating the vehicle along a route.

12. The system of claim 10, wherein the instructions further include instructions to determine the allocation rule based further on a time of day the vehicle is operating, wherein the allocation rule is different at different times of day.

13. The system of claim 10, wherein the instructions further include instructions to determine the allocation rule based further on an identifier for the vehicle, wherein the allocation rule is different for different vehicles.

14. The system of claim 10, wherein the instructions further include instructions to determine the allocation rule based further on a route for the vehicle to travel, wherein the allocation rule is different for different routes.

15. The system of claim 10, wherein the instructions further include instructions to determine the allocation rule based further on an occupancy rate of the vehicle, wherein the allocation rule is different for different occupancy rates.

16. The system of claim 10, wherein the instructions further include instructions to receive the request from a user device, the request specifying an identifier of the user device.

17. The system of claim 16, wherein the instructions further include instructions to authorize the request based further on querying the electronic ledger to determine the identifier of the user device is an authorized identifier.

18. The system of claim 10, wherein the instructions further include instructions to initiate the request based on a location of the vehicle.

* * * * *